US012583207B2

(12) United States Patent
Chamberlain et al.

(10) Patent No.: US 12,583,207 B2
(45) Date of Patent: Mar. 24, 2026

(54) LAMINATED GLASS, ELECTRICAL ISOLATION MEASUREMENT SYSTEM HAVING THE SAME, METHOD OF MANUFACTURING THE SAME, AND USE OF THE SAME

(71) Applicant: PILKINGTON GROUP LIMITED, Lathom (GB)

(72) Inventors: Mark Andrew Chamberlain, Lathom (GB); Sylwia Hurst, Burscough (GB)

(73) Assignee: Pilkington Group Limited, Lathom (GB)

( * ) Notice: Subject to any disclaimer, the term of this patent is extended or adjusted under 35 U.S.C. 154(b) by 385 days.

(21) Appl. No.: 17/912,076

(22) PCT Filed: Mar. 18, 2021

(86) PCT No.: PCT/GB2021/050682
§ 371 (c)(1),
(2) Date: Sep. 16, 2022

(87) PCT Pub. No.: WO2021/186187
PCT Pub. Date: Sep. 23, 2021

(65) Prior Publication Data
US 2023/0138087 A1 May 4, 2023

(30) Foreign Application Priority Data
Mar. 19, 2020 (GB) ...................................... 2003994

(51) Int. Cl.
B32B 17/10 (2006.01)
B32B 38/00 (2006.01)

(52) U.S. Cl.
CPC .... B32B 17/1022 (2013.01); B32B 17/10036 (2013.01); B32B 17/10385 (2013.01);
(Continued)

(58) Field of Classification Search
CPC ........ B32B 17/10036; B32B 17/10183; B32B 17/1022; B32B 17/10385;
(Continued)

(56) References Cited

U.S. PATENT DOCUMENTS 2,507,036 A * 5/1950 McCrumm ........... B64C 1/1492
219/203
4,939,348 A 7/1990 Criss
(Continued)

FOREIGN PATENT DOCUMENTS

EP 3034295 A1 6/2016
WO 03024155 A2 3/2003

*Primary Examiner* — Steven W Crabb
*Assistant Examiner* — Ket D Dang
(74) *Attorney, Agent, or Firm* — Marshall & Melhorn, LLC

(57) ABSTRACT

The present invention concerns a laminated glass, comprising first and second glass sheets and a ply of interlayer material therebetween; a heating element arranged on a surface of the second glass sheet adjacent the ply of interlayer material; a circumference of the heating element spaced from an edge of the second glass sheet forming a circumferential region between the circumference and the edge of the second glass sheet where conductive material of the heating element has been at least partly removed; a conductive ring configured in the circumferential region spaced from the circumference and spaced from the edge of the second glass sheet and electrically isolated from the heating element wherein conductive materials of the heating element and the conductive ring are different.

15 Claims, 5 Drawing Sheets

(52) U.S. Cl.
CPC ........ *B32B 38/145* (2013.01); *B32B 2250/02* (2013.01); *B32B 2307/202* (2013.01); *B32B 2307/302* (2013.01); *B32B 2307/714* (2013.01)

(58) Field of Classification Search
CPC .......... B32B 17/10761; B32B 2250/02; B32B 2307/202; B32B 2307/302; B32B 2307/714; B32B 38/145; B32B 2255/205; B32B 2311/16; G08B 13/04; H05B 3/84
USPC ....................................................... 219/203
See application file for complete search history.

(56) References Cited

U.S. PATENT DOCUMENTS

| | | | |
|---|---|---|---|
| 9,555,462 B2 * | 1/2017 | Langendorf | ........... B23K 11/34 |
| 9,900,932 B2 | 2/2018 | Degen et al. | |
| 2003/0113551 A1 * | 6/2003 | Thomsen | ............. C03C 17/3639 |
| | | | 428/435 |
| 2007/0184282 A1 | 8/2007 | Hauser | |
| 2015/0137837 A1 * | 5/2015 | Jiao | ................... B32B 17/10036 |
| | | | 324/694 |
| 2015/0312967 A1 * | 10/2015 | Qian | ........................ H05B 3/84 |
| | | | 219/202 |
| 2016/0101603 A1 | 4/2016 | Boote | |
| 2016/0221442 A1 * | 8/2016 | Atsumi | ...................... B60J 1/08 |
| 2019/0006547 A1 * | 1/2019 | Watts | .................... H10F 19/807 |
| 2019/0037649 A1 | 1/2019 | Schulz et al. | |

* cited by examiner

10

1, 2, 3    4    5    6    7

10

LAMINATED GLASS, ELECTRICAL ISOLATION MEASUREMENT SYSTEM HAVING THE SAME, METHOD OF MANUFACTURING THE SAME, AND USE OF THE SAME

FIELD OF THE INVENTION

The invention concerns a laminated glass for electrical heating, an electrical isolation measurement system having the same, a method of manufacturing the same and use of the same, for example, as a heater for a building or a window for a vehicle.

BACKGROUND OF THE INVENTION

Laminated glass having a heating element positioned between plies of the laminate is well known. For example, a heating element may comprise a conductive coating or an array of conductive wires. It is known to delete an edge portion of the conductive coating, or to cut edge portions of the array of conductive wires, to reduce a risk of conductive material at an edge of the laminated glass. Conductive material at the edge of the laminated glass would compromise electrical insulation at the edge of the laminated glass. Such conductive material still electrically connected to the heating element could result in an electric shock to a person touching the edge. Conductive material at the edge of the laminated glass could also be a path for water penetration leading to water corrosion of the conductive material and possible delamination of the laminated glass, limiting the lifetime of the laminated glass.

U.S. Pat. No. 4,939,348A (Criss) discloses a heated transparency with discontinuity detection system. A break in a voltage sensor lead around the perimeter of the transparency causes a voltage comparator to detect a voltage difference.

U.S. Pat. No. 9,900,932B2 (Degen) discloses a panel heater with temperature monitoring, comprising a composite pane having a conductive coating applied to a main surface of a substrate. A circumferential separating line 1 cm from a substrate edge electrically partitions an edge strip of the conductive coating from an inner remainder of the conductive coating, which serves as a heating field. The edge strip provides electrical insulation of the heating field and protects against corrosion penetrating from the edge.

OBJECTIVES OF THE INVENTION

An objective of the invention is to provide a laminated glass comprising a heating element and having improved electrical safety. Another objective is to provide a laminated glass having improved resistance to corrosion. Another objective is to provide a method of manufacturing including a step of electrical safety testing.

SUMMARY OF THE INVENTION

The invention provides a laminated glass, comprising first and second glass sheets and at least a ply of interlayer material therebetween; a heating element arranged on a surface of the second glass sheet adjacent the ply of interlayer material; a circumference of the heating element spaced from an edge of the second glass sheet forming a circumferential region between the circumference and the edge of the second glass sheet where conductive material of the heating element has been at least partly removed; and a conductive ring configured in the circumferential region spaced from the circumference and spaced from the edge of the second glass sheet and electrically isolated from the heating element wherein conductive materials of the heating element and the conductive ring are different.

The invention is greatly advantageous because a laminated glass having a heating element and a conductive ring configured in a circumferential region where conductive material of the heating element has been removed has improved electrical safety. The conductive ring, in use as part of an electrical isolation measurement system, verifies that all conductive material outside the heating element has been removed. Risk of residual conductive material in the circumferential region is thereby eliminated. The conductive ring provides a means of testing electrical isolation during manufacture and remains in the finished product as a means of testing for corrosion in service.

Surprisingly, the inventors have found that a conductive ring configured in a circumferential region where conductive material of the heating element has been removed results in a more sensitive electrical isolation test than by conventional means, such as testing with a probe along the edge of the laminated glass.

In a preferred embodiment, a result of the more sensitive electrical isolation test is that the laminated glass meets electrical safety requirements as double insulated, i.e. designed in such a way that it does not require a connection to electrical earth (ground). No single failure can result in a dangerous voltage becoming exposed so that it might cause electric shock, i.e. an outer surface is not conductive and is separated from live conductors by insulating material.

Furthermore, the conductive ring may also function as a barrier to water penetration. Risk of water corrosion is thereby mitigated or eliminated.

In another advantageous embodiment, terminals of the conductive ring are available externally in the finished product so that an electrical isolation test may be repeated during the lifetime of the product.

Preferably, the conductive ring comprises first and second ends and a gap therebetween.

Preferably, the laminated glass further comprises first and second connection points at first and second ends of the conductive ring.

Preferably, the laminated glass further comprises first and second busbars to supply electrical power to the heating element; preferably arranged on the circumference of the heating element.

Preferably, the laminated glass further comprises first and second extensions, electrically connected to first and second busbars respectively, and further comprising first and second terminals respectively, arranged between the circumference and the conductive ring.

Preferably, the laminated glass further comprises a junction box arranged to cover first and second terminals and optionally first and/or second connection points.

Preferably, the heating element is a conductive coating comprising a transparent conductive oxide or an array of wires comprising tungsten or copper.

Preferably, the conductive ring comprises copper and is shaped as wire, strip or braid embedded in the ply of interlayer material; or the conductive ring is printed in the circumferential region using a conductive ink comprising silver powder, silver spheres, graphite powder, graphite rods, carbon nanotubes or glass flakes having a conductive coating; or printed using sprayed particles.

Preferably, the conductive ring is bonded to the circumferential region by a conductive adhesive comprising silver powder, silver spheres, graphite powder, graphite rods, carbon nanotubes or glass flakes having a conductive coating.

The invention provides an electrical isolation measurement system comprising a laminated glass according to the invention and an electronic device electrically connected via cables to the heating element and to the conductive ring to measure resistance or leakage current.

Preferably, the electronic device is electrically connected between the heating element and the conductive ring, more preferably a test voltage is applied and current flow through the electronic device is measured.

The invention provides a method for manufacturing a laminated glass according to the invention, comprising steps: bonding first and second glass sheets with at least a ply of interlayer material therebetween; arranging a heating element at a surface of the second glass sheet adjacent the ply of interlayer material; spacing a circumference of the heating element from an edge of the second glass sheet by forming a circumferential region between the circumference and the edge of the second glass sheet where conductive material of the heating element has been at least partly removed; configuring a conductive ring in the circumferential region spaced from the circumference and spaced from the edge of the second glass sheet and electrically isolated from the heating element wherein conductive materials of the heating element and the conductive ring are different.

Preferably, the method for manufacturing a laminated glass further comprises a step of providing a gap in the conductive ring and providing first and second connection points at first and second ends of the conductive ring.

Preferably, the method for manufacturing a laminated glass further comprises a step of arranging first and second busbars on the circumference.

Preferably, the conductive ring is printed by silk-screen printing or inkjet printing or by spraying particles of copper, zinc, aluminium or alumina; or the conductive ring is a copper strip or a wire braid, embedded in the ply of interlayer material; the conductive ring may have sides of any shape, for example straight, arcuate, or sinusoidal.

Preferably, the method for manufacturing a laminated glass comprises a step of measuring electrical isolation between the heating element and the conductive ring.

In a fourth aspect, the present invention provides use of a laminated glass according to the invention as a heater panel in a building wherein a surface (S4) of the second glass sheet is adjacent a wall; or as a heated window in a motor vehicle.

The invention will now be further disclosed by non-limiting drawings, non-limiting examples and a comparative example.

DETAILED DESCRIPTION OF THE INVENTION

Figure 1:
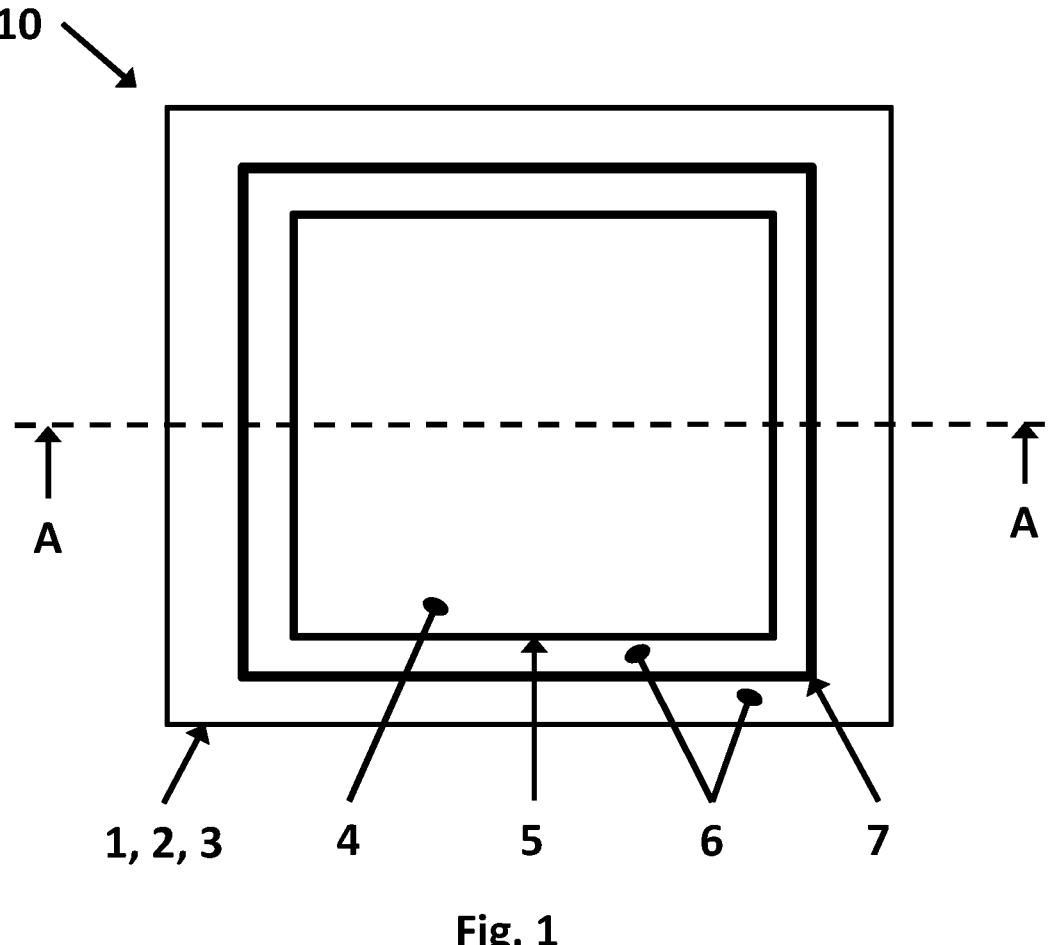
FIG. 1 is an embodiment of the invention having a conductive ring without a gap.

FIG. 1 discloses a laminated glass (10) according to the invention comprising a first glass sheet (1) and a second glass sheet (2) bonded together by a ply of interlayer material (3).

A surface of the first glass sheet (1) not facing the ply of interlayer material (3) is surface 1 (S1). A surface of the first glass sheet (1) facing the ply of interlayer material (3) is surface 2 (S2). A surface of the second glass sheet (2) facing the ply of interlayer material (3) is surface 3 (S3). A surface of the second glass sheet (2) not facing the ply of interlayer material (3) is surface 4 (S4).

For example, the laminated glass (10) is a window wherein the first glass sheet (1) is an outer glass sheet and the second glass sheet (2) is an inner glass sheet and the surfaces (S1, S2, S3, S4) are numbered in sequence from the outside.

A heating element (4) is disposed on the ply of interlayer material (3) or on the second glass sheet (2). The heating element (4) may comprise a transparent conductive coating, for example a transparent conductive oxide such as tin oxide or fluorine-doped tin oxide deposited on the second glass sheet (2) during the glass manufacturing.

A circumference (5) of the heating element (4) is spaced from the edge of the second glass sheet (2) by a circumferential region (6) between the circumference (5) and the edge of the second glass sheet (2). Conductive material of the heating element (4) has been at least partly removed in the circumferential region. Advantageously, the conductive material is completely removed.

Removal of conductive material in the form of a coating may be by laser deletion, mechanical abrasion or other methods known in the art. If the coating is applied by sputtering, removal may include masking the second glass sheet (2) during sputtering so that little or no coating is deposited in the circumferential region (6).

A conductive ring (7) is configured in the circumferential region (6) spaced from the circumference (5) and spaced from the edge of the second glass sheet (2) and electrically isolated from the heating element (4). Conductive materials of the heating element (4) and the conductive ring (7) are different. The conductive ring (7) may by formed by screen printing a conductive ink comprising silver powder, silver spheres, graphite powder, graphite rods, carbon nanotubes or glass flakes having a conductive coating. Alternatively, the conductive ring (7) comprises copper and is shaped as wire, strip or braid embedded in the ply of interlayer material. Optionally, the conductive ring (7) is bonded to the circumferential region (6) by a conductive adhesive comprising silver powder, silver spheres, graphite powder, graphite rods, carbon nanotubes or glass flakes having a conductive coating.

Figure 2:
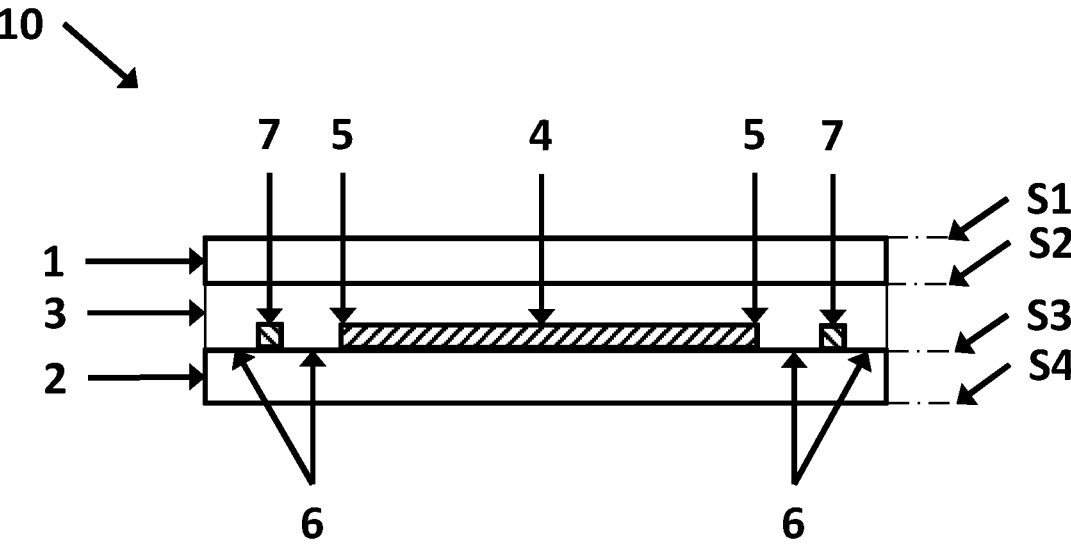
FIG. 2 is the embodiment of FIG. 1 in cross-section.

FIG. 2 discloses the embodiment of FIG. 1 in cross-section on the line A-A. Thickness of the heating element (4) and the conductive ring (7) are exaggerated for clarity. In practice, thickness of the heating element (4) is typically 0.1 to 1 μm, and thickness of the conductive ring (7) is 1 to 100 μm.

Figure 3:
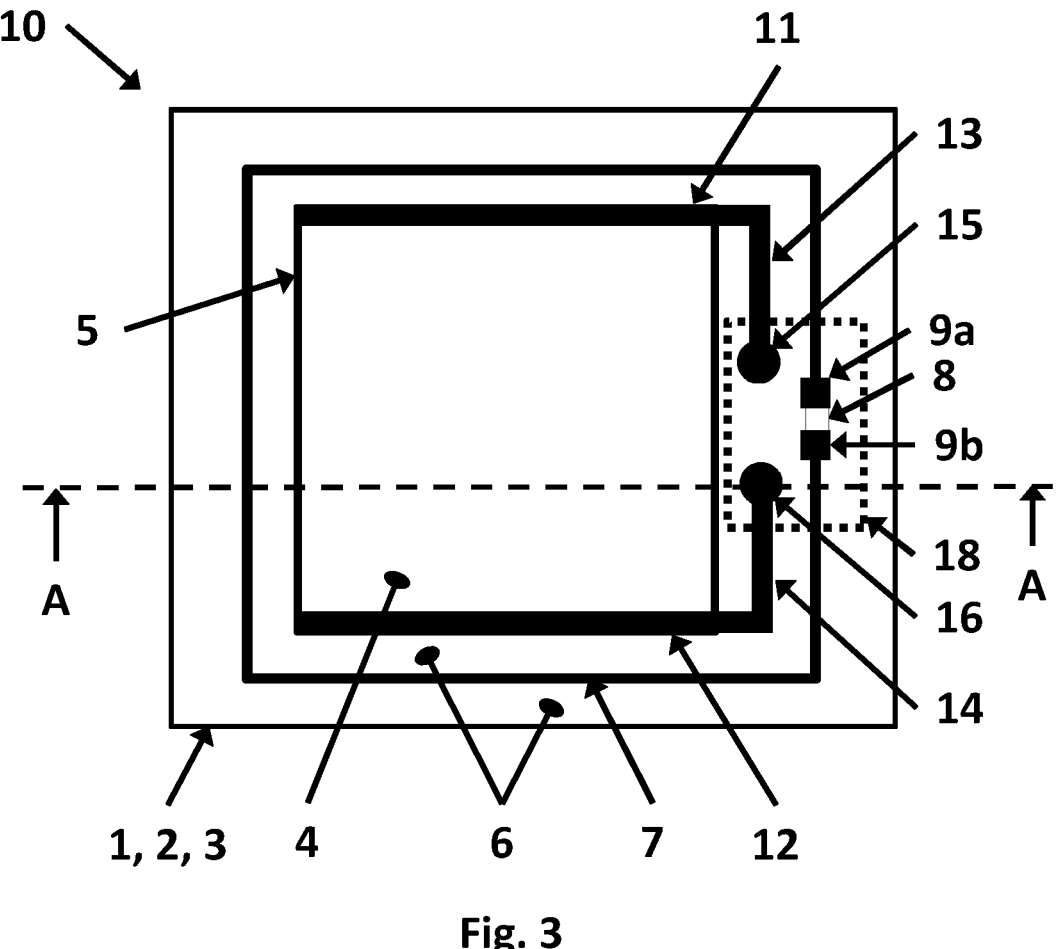
FIG. 3 is an embodiment of the invention having busbars, extensions and a gap.

FIG. 3 discloses a laminated glass (10) according to the invention like the embodiment of FIG. 1 but further comprising a gap (8) between first and second ends of the conductive ring (7); first and second connection points (9a, 9*b*) at first and second ends of the conductive ring (7); first and second extensions (13, 14) electrically connected to first and second busbars (11, 12) respectively, electrically connected to first and second terminals (15, 16) respectively; and a junction box (18) positioned over first and second terminals (15, 16).

Figure 4:
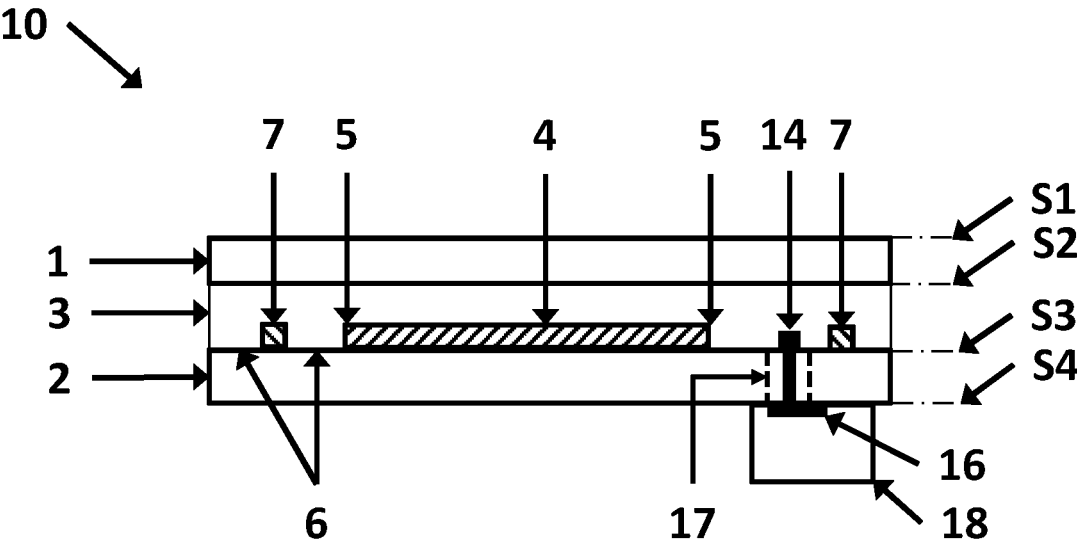
FIG. 4 is the embodiment of FIG. 3 in cross-section.

FIG. 4 discloses the embodiment of FIG. 3 in cross-section on the line A-A through the second terminal (16). A portion of the second extension (14) passes through hole (17) in the second glass sheet (2) and connects with the second terminal (16) on a surface (S4) of the second glass sheet (2).

A junction box (18) is bonded to the second glass sheet (2) to electrically insulate first and second terminals (15, 16) and terminate a cable (not shown) from an external power supply. The junction box (18) may also cover a thermostat, for example an automatic reset bimetallic disc thermostat, in series with the second terminal (16) to interrupt current from the external power supply in case of excessive temperature of the second glass sheet (2).

Figure 5:
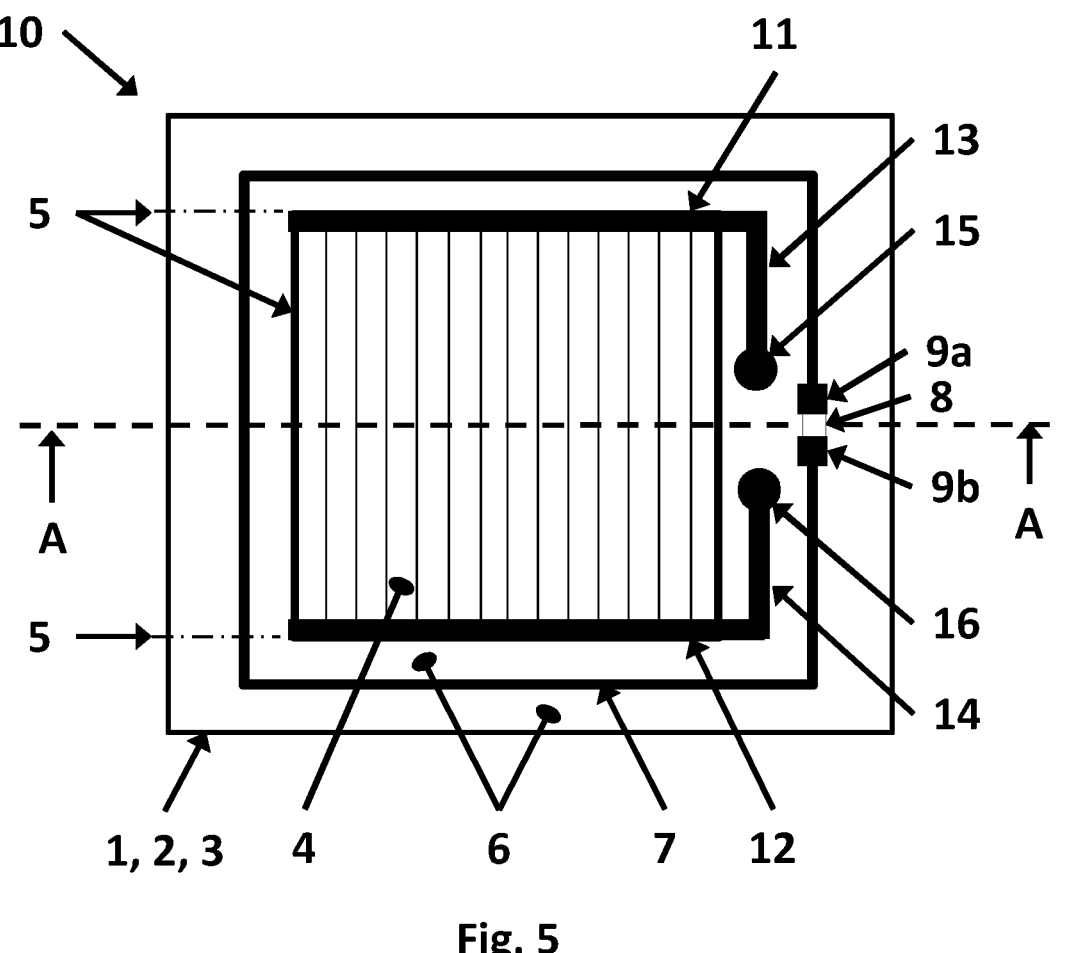
FIG. 5 is an embodiment of the invention having wires as a heating element.

FIG. 5 discloses a laminated glass (10) according to the invention like the embodiment of FIG. 1 wherein the heating element (4) is an array of heating wires.

Figure 6:
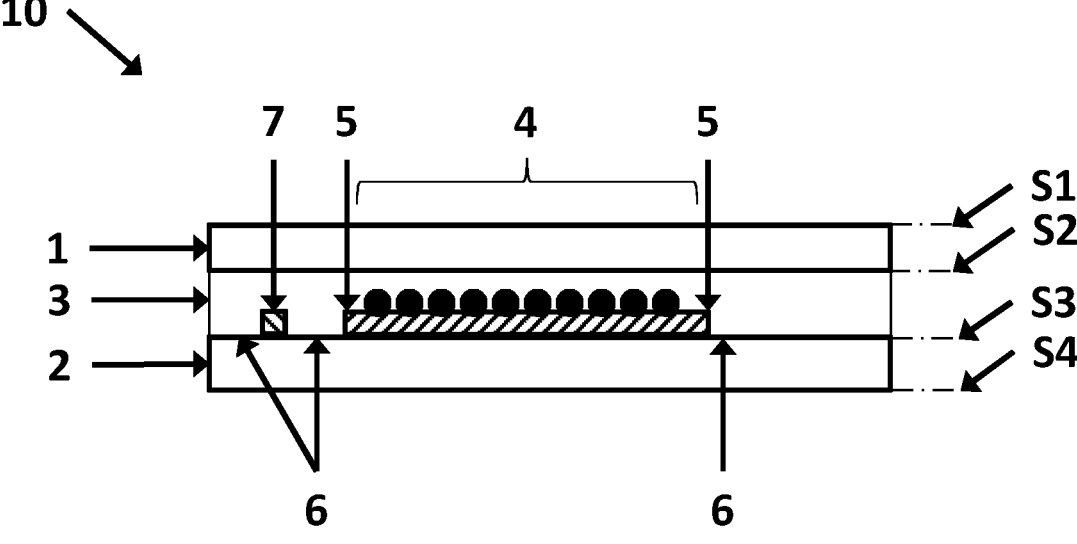
FIG. 6 is the embodiment of FIG. 5 in cross-section.

FIG. 6 discloses the embodiment of FIG. 5 in cross-section on the line A-A through the gap (8). The heating wires are optionally mounted on another ply of interlayer material to form the heating element (4).

Figure 7:
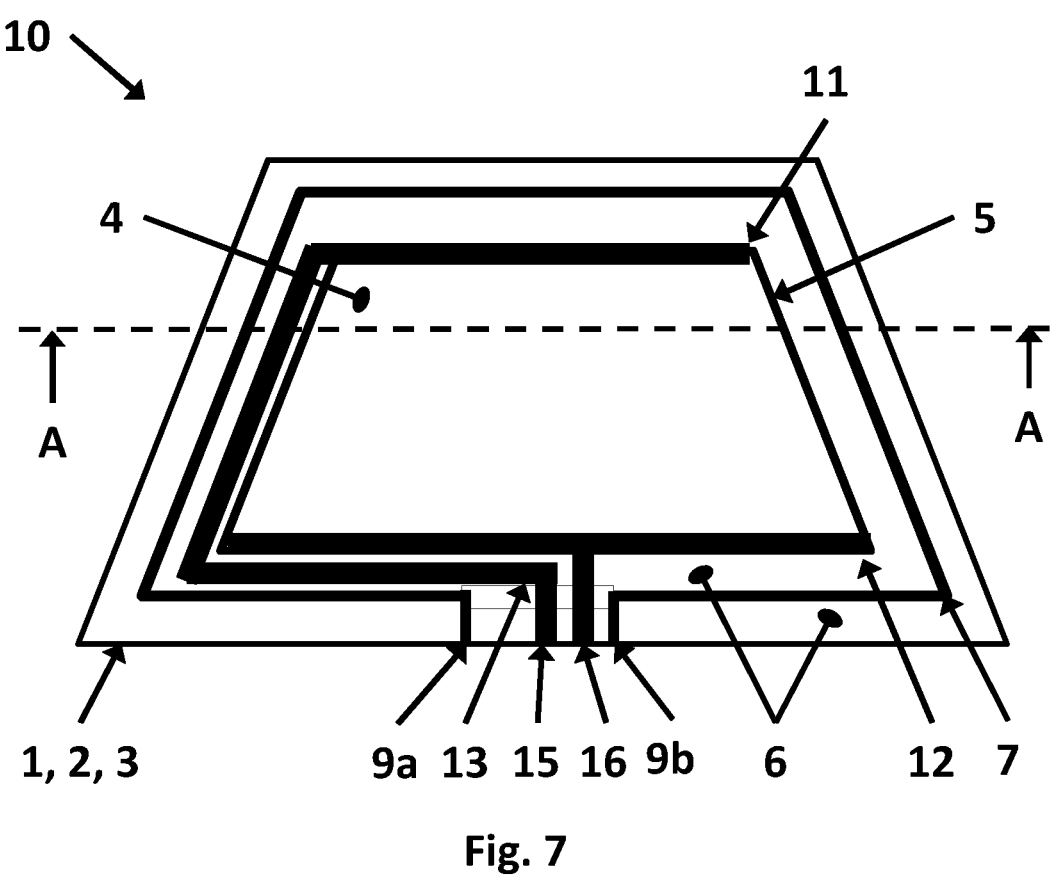
FIG. 7 is an embodiment of the invention having a coating as heating element.

FIG. 7 discloses a laminated glass (10) according to the invention like the embodiment of FIG. 1 wherein first and second glass sheets (1, 2) are shaped to be suitable for a window of a motor vehicle, for example a trapezoidal windshield.

Figure 8:
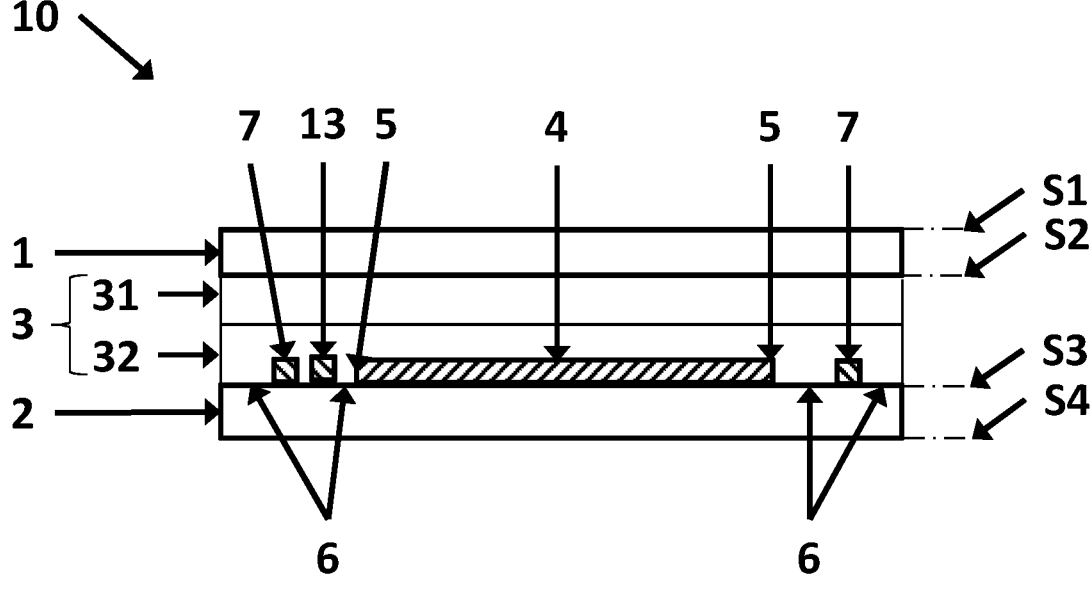
FIG. 8 is the embodiment of FIG. 7 in cross-section.

FIG. 8 discloses the embodiment of FIG. 7 in cross-section on the line A-A through the first extension (13). The ply of interlayer material (3) may comprise first and second plies of interlayer material (31, 32), which may be different from each other and may be a polymer, such as polyvinyl butyral (PVB) of thickness 0.76 mm, or partly opaque, such as lace or carbon fibre sheet, or a printed layer or image, for example on a surface (S2) of the first glass sheet (1). First and second glass sheets (1, 2) may be soda-lime glass.

Figure 9:
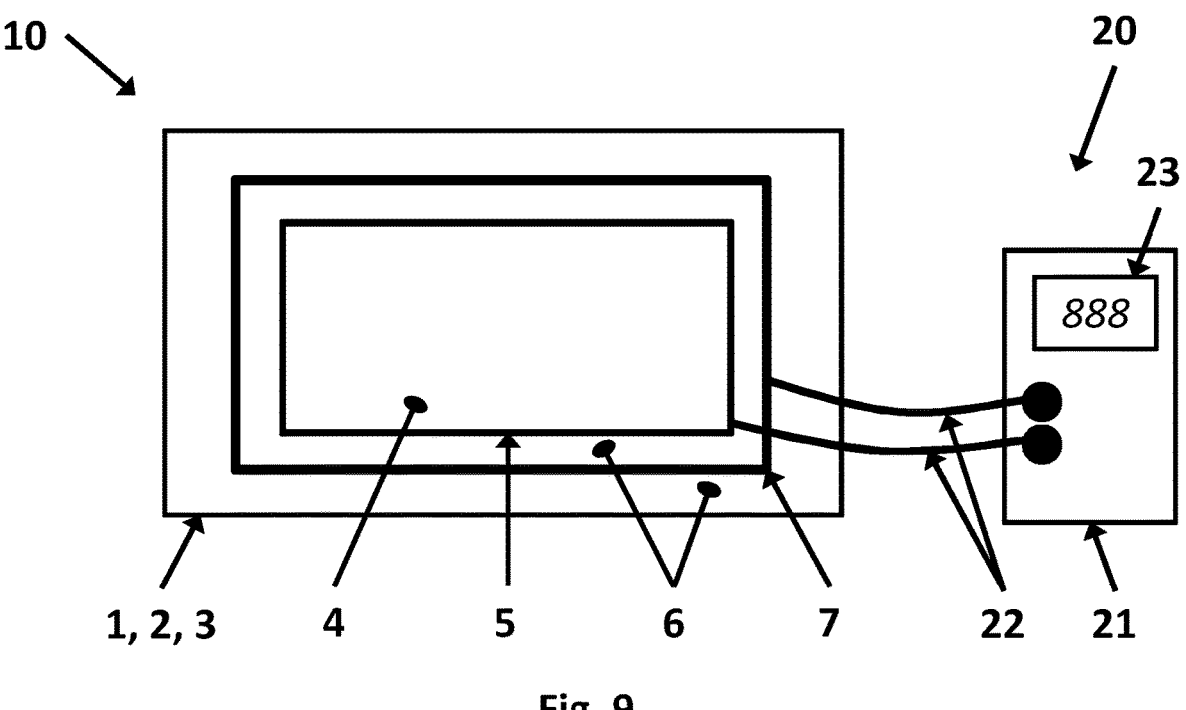
FIG. 9 is an embodiment of an electrical isolation measurement system.

FIG. 9 discloses an electrical isolation measurement system (20) comprising a laminated glass (10) like FIG. 1 and an electronic device (21) electrically connected via cables (22) to the heating element (4) and to the conductive ring (7) to measure resistance or leakage current.

Figure 10:
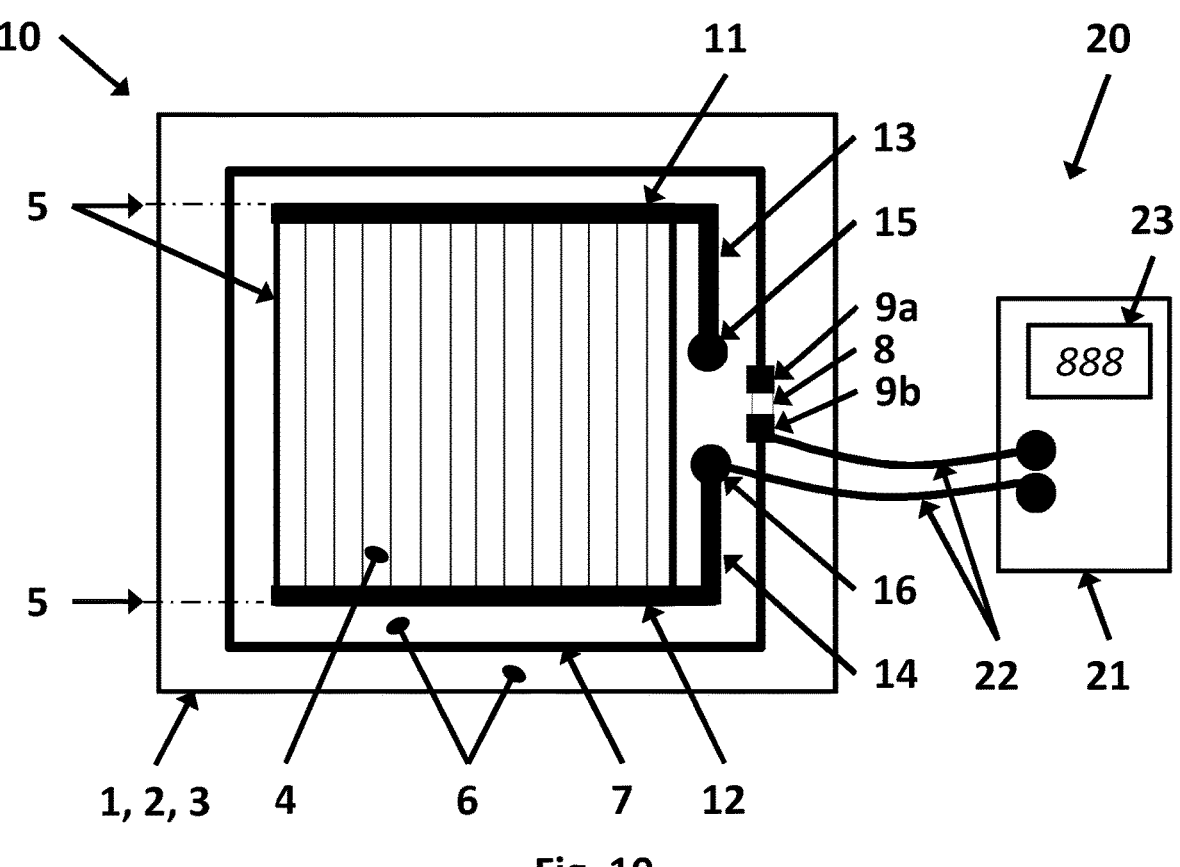
FIG. 10 is another embodiment of an electrical isolation measurement system.

FIG. 10 discloses an electrical isolation measurement system (20) comprising a laminated glass (10) like FIG. 5 and an electronic device (21) electrically connected via cables (22) to the heating element (4) and to the conductive ring (7) via second terminal (16) and second connection point (9*b*) respectively, to measure resistance or current.

Examples and Comparative Example

The invention may be used as an electrical heater for a building, for example, mounted on a wall. The invention may also be used for heated windows of vehicles for land, sea and air, for example as a windshield of a motor vehicle.

A comparative example is the transparency of U.S. Pat. No. 4,939,348A (Criss), having a voltage sensor lead around a perimeter of the transparency, connected at one end to a busbar extension strip on the transparency. This busbar extension strip is connected as a reference voltage to a comparator circuit. The other end of the voltage sensor lead has a terminal connected to the comparator circuit to sense a voltage difference.

The transparency of the comparative example has a voltage sensor lead connected to a busbar extension strip, rather than having an isolated conductive ring (7) according to the invention. So, the comparative example has a permanent low resistance connection to an electroconductive coating via the busbar extension strip and thus is not suitable for measuring electrical isolation from the coating. The comparative example is set up as a discontinuity detection system sensing voltage difference, in contrast to the invention which measures electrical isolation by measuring resistance or leakage current.

In an example according to the invention, as shown in FIG. 1 to FIG. 10, the conductive ring (7) is isolated from the heating element (4), suitable for measuring electrical isolation between the heating element (4) and the conductive ring (7). An electronic device (21) connected between the heating element (4) and the conductive ring (7) will reliably detect residual conductive material by, for example, applying a test voltage and measuring current flow through the electronic device (21). In this example, the electronic device (21) is a resistance meter.

In another example according to the invention, a voltage is applied to first and second busbars and the conductive ring (7) is connected to electrical ground (earth). A residual current device (RCD) connected in series with the heating element (4) serves as the electronic device (21). The RCD measures residual current, i.e. any imbalance between the current flowing from the first busbar and the current returning to the second busbar. Residual current is due to a leakage to earth via the conductive ring (7). If residual current exceeds a threshold, the RCD switches off electrical supply to the heating element (4), indicated by a circuit trip indicator (23).

In another example according to the invention, water ingress to the laminated glass (10) carrying conductive salts causes corrosion and forms a conductive path in the circumferential region (6). An electronic device (21), for example a digital ohmmeter having an indicator (23) for displaying a resistance measurement, is connected via cables (22) between the heating element (4) and the conductive ring (7). Corrosion is detected if the resistance is measurable.

KEY TO THE DRAWINGS

References in the drawings are as follows:
1, 2—First and second glass sheets
3—Ply of interlayer material
4—Heating element
5—Circumference
6—Circumferential region
7—Conductive ring
8—Gap
9*a*, 9*b*—First and second connection points
10—Laminated glass
11, 12—First and second busbars
13, 14—First and second extensions
15, 16—First and second terminals
17—Hole
18—Junction box
20—Electrical isolation measurement system
21—Electronic device
22—Cables
23—Indicator
31, 32—First, second ply of interlayer material

The invention claimed is:

1. A laminated glass, comprising:
first and second glass sheets and a ply of interlayer material therebetween;
a heating element arranged on a surface of the second glass sheet adjacent the ply of interlayer material;
a circumference of the heating element spaced from an edge of the second glass sheet forming a circumferential region between the circumference and the edge of the second glass sheet where conductive material of the heating element has been removed; and
a conductive ring configured in the circumferential region spaced from the circumference and spaced from the edge of the second glass sheet and electrically isolated from the heating element wherein the conductive material of the heating element and conductive material of the conductive ring are different, and wherein the conductive ring is suitable for measuring electrical isolation between the heating element and the conductive ring by measuring resistance or leakage current using an electronic device electrically connected via cables to the heating element and to the conductive ring;
wherein the conductive ring is part of an electrical isolation measurement system configured to verify that all conductive material of the heating element outside the heating element has been removed; and
wherein the conductive ring comprises copper and is shaped as a wire, strip or braid embedded in the ply of interlayer material or wherein the conductive ring is printed in the circumferential region using a conductive ink comprising silver powder, silver spheres, graphite powder, graphite rods, carbon nanotubes or glass flakes having a conductive coating, or sprayed particles.

2. The laminated glass according to claim 1, wherein the conductive ring comprises first and second ends and a gap therebetween.

3. The laminated glass according to claim 2, further comprising first and second connection points at the first and second ends of the conductive ring.

4. The laminated glass according to claim 1, further comprising first and second busbars to supply electrical power to the heating element.

5. The laminated glass according to claim 4, wherein the first and second busbars are arranged on the circumference of the heating element.

6. The laminated glass according to claim 4, further comprising first and second extensions electrically connected to the first and second busbars respectively and further comprising first and second terminals respectively arranged between the circumference and the conductive ring.

7. The laminated glass according to claim 6, further comprising a junction box arranged to cover the first and second terminals.

8. The laminated glass according to claim 1, wherein the heating element is a conductive coating comprising a transparent conductive oxide or an array of wires comprising tungsten or copper.

9. The laminated glass according to claim 1, wherein the conductive ring is bonded to the circumferential region by a conductive adhesive comprising silver powder, silver spheres, graphite powder, graphite rods, carbon nanotubes or glass flakes having a conductive coating, and wherein the conductive ring comprises copper and is shaped as a wire, strip or braid embedded in the ply of interlayer material.

10. An electrical isolation measurement system comprising a laminated glass according to claim 1 and an electronic device electrically connected via cables to the heating element and to the conductive ring to measure resistance or leakage current.

11. The method for manufacturing a laminated glass according to claim 1, wherein the conductive ring functions as a barrier to water penetration.

12. An electrical isolation measurement system comprising a laminated glass according to claim 11 and an electronic device electrically connected via cables to the heating element and to the conductive ring to measure resistance or leakage current.

13. A method for manufacturing a laminated glass, comprising:
bonding first and second glass sheets with a ply of interlayer material therebetween;
arranging a heating element at a surface of the second glass sheet adjacent the ply of interlayer material;
spacing a circumference of the heating element from an edge of the second glass sheet by forming a circumferential region between the circumference and the edge of the second glass sheet where conductive material of the heating element has been at least partly removed;
configuring a conductive ring formed of a conductive material in the circumferential region spaced from the circumference and spaced from the edge of the second glass sheet and electrically isolated from the heating element wherein the conductive material of the heating element is different from the conductive material of the conductive ring, and wherein the conductive ring is suitable for measuring electrical isolation between the heating element and the conductive ring by measuring resistance or leakage current using an electronic device electrically connected via cables to the heating element and to the conductive ring; and
measuring electrical isolation between the heating element and the conductive ring;
wherein the conductive ring is printed by silk-screen printing or inkjet printing or by spraying particles, or is a copper strip or a wire braid, embedded in the ply of interlayer material.

14. The method for manufacturing a laminated glass according to claim 13, wherein the conductive ring functions as a barrier to water penetration.

15. A laminated glass, comprising:
first and second glass sheets and a ply of interlayer material therebetween;
a heating element arranged on a surface of the second glass sheet adjacent the ply of interlayer material;
a circumference of the heating element spaced from an edge of the second glass sheet forming a circumferential region between the circumference and the edge of the second glass sheet where conductive material of the heating element has been removed; and
a conductive ring formed of a conductive material configured in the circumferential region spaced from the circumference and spaced from the edge of the second glass sheet and electrically isolated from the heating element wherein the conductive material of the heating element is different from the conductive material of the conductive ring, and wherein the conductive ring is suitable for measuring electrical isolation between the heating element and the conductive ring by measuring resistance or leakage current using an electronic device electrically connected via cables to the heating element and to the conductive ring;

wherein the conductive ring is part of an electrical isolation measurement system configured to verify that all conductive material of the heating element outside the heating element has been removed; and wherein the conductive ring functions as a barrier to water penetration.

* * * * *